PROCESS FOR PRODUCING HIGH QUALITY TOWN GAS FOR DELIVERY
Filed May 22, 1964
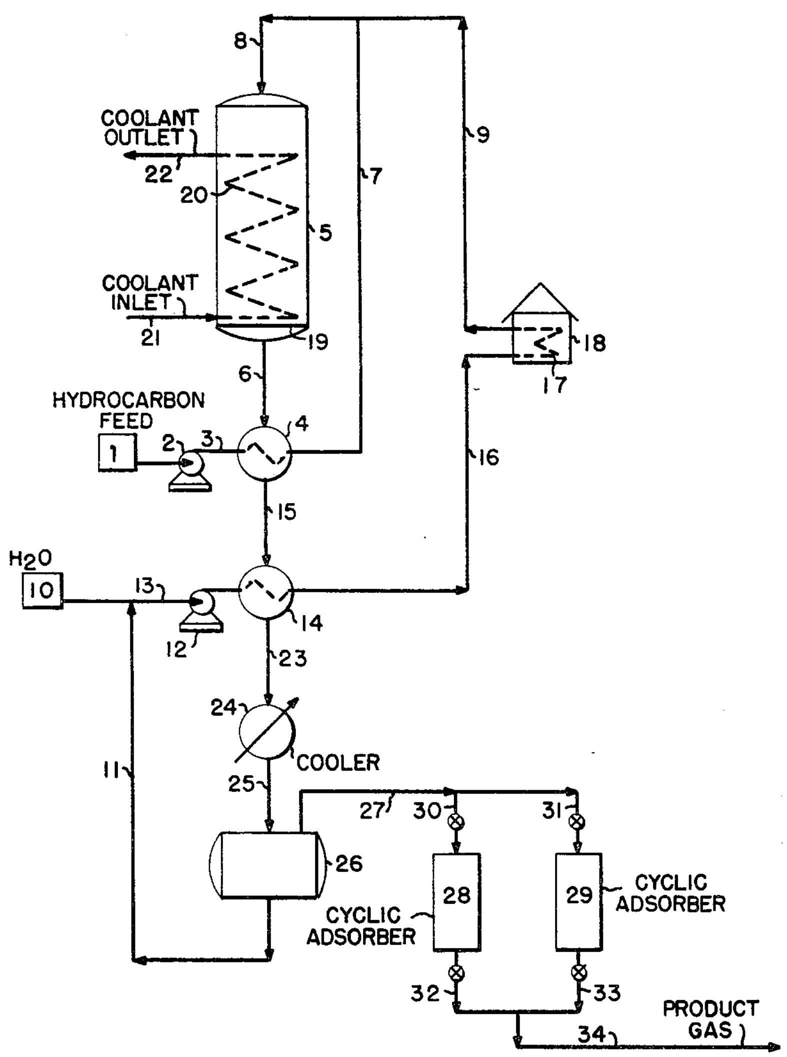
John E. Hofmann
William R. Epperly
Barry N. Heimlich
Inventors
By Henry Berk
Patent Attorney United States Patent Office 3,508,889 Patented Apr. 28, 1970

1

3,508,889

PROCESS FOR PRODUCING HIGH QUALITY TOWN GAS FOR DELIVERY

John E. Hofmann, Berkeley Heights, William R. Epperly, Murray Hill, and Barry N. Heimlich, Union, N.J., assignors to Esso Research and Engineering Company, a corporation of Delaware Filed May 22, 1964, Ser. No. 369,388
Int. Cl. C10g *11/28*
U.S. Cl. 48—214 4 Claims

ABSTRACT OF THE DISCLOSURE

A Town Gas of constant heating value is continuously produced by progressively adjusting conversions of feed hydrocarbons to partially compensate for decreasing activity of the Town Gas catalyst.

This invention is concerned with a process for producing and recovering a high quality Town Gas ready for delivery as a natural gas substitute by use of steps for maintaining constant heating value and by economical steps of purifying the gas, particularly in drying the gas under high pressure.

The Town Gas of particular interest to which this invention is directed is produced most favorably by reacting mixtures of low boiling hydrocarbons containing principally paraffin hydrocarbons in the $C_2$ to $C_{10}$ range with a suitable amount of steam in the presence of a very active catalyst at low reaction temperatures, e.g., in the range of 600° to 925° F., and under elevated pressures in the range of 100 to 1000 p.s.i.g. The conditions of reaction are adjusted to obtain a high conversion of the feed hydrocarbons to methane while leaving a certain portion of the hydrocarbons, which are unreacted or partly decomposed, in the gaseous product.

It has now been found that the conversion of the feed hydrocarbons can be controlled using a catalyst and conditions that will be described in more detail to obtain a sufficiently high conversion of the higher molecular weight hydrocarbons in the feed over extended periods of time as to keep the heating value of the gas product practically constant when the gas product is given a separation treatment which makes the gas product retain an increasing amount of the $C_2$ to $C_5$ hydrocarbons while at the same time making such a gas product meet dew point specifications in removing practically all water, and if desired, a substantial amount of the $CO_2$ components so that the gas product can have a desired heating value, e.g., in the range of 700 to 950 B.t.u./s.c.f.

In comparison to well-known processes of making water-gas or oil-carburetted gas, the Town Gas made by the low-temperature reaction of the liquefiable petroleum gases and light naphtha hydrocarbons with steam in the presence of a highly active nickel catalyst has a number of advantages, e.g., in the composition, heating value, preparation for distribution, and characteristics for use as a natural gas substitute in natural gas burners. The apparatus and facilities needed for making the low-temperature Town Gas are simple and compact. The feed materials are conveniently pumped in streams through parts of the unit. The operation is started easily when needed to supply a desired amount of gas continuously to a piping system of a town or place where the gas is to supplement a natural gas supply. The amount of heat energy required is low and the amount of effluent cooling required is easily satisfied, particularly insofar as the initial hydrocarbon feed material includes liquefied normally gaseous hydrocarbons.

The optimum process conditions to be employed for

2 producing the Town Gas product suitable for the simplified purification are outlined as follows:

Catalyst: high activity nickel catalyst such as a barium promoted $Ni\text{-}Al_2O_3$ catalyst obtained by a coprecipitation, drying, calcining in air, and activation with $H_2$ under proper conditions.

Temperature: 600° to 925° F. The initial inlet temperature of the reaction mixture should preferably not exceed for most of the run 750° F. The outlet temperature is preferably maintained below 900° or 925° F.

Pressure: 100 to 1000 p.s.i.g. The pressure is preferably maintained in the range of 400 to 700 p.s.i.g., the pressure being about 200 p.s.i. below the temperature in degrees Fahrenheit.

Hydrocarbon mass space velocity: 1 to 12 lbs. (w.) of hydrocarbon feed per hour per lb. (w.) of catalyst. The optimum range is 2 to 5 w./w./hr.

Steam to hydrocarbon ratio: 1 to 4 lbs. of water per lb. of hydrocarbon feed. The preferred ratio is 1.5 to 2.5 lbs. $H_2O$ per lb. of hydrocarbon feed.

By using the conditions outlined with a suitable catalyst the hydrocarbon feeds are converted to a gas product under suitable low temperatures, at elevated pressures and of suitable composition is a simplified purification which makes the gas have a sufficiently high calorific value and meet dew point requirements.

Also other kinds of nickel catalysts might meet the requirements for the desired conversion. The catalysts which have been found most suitable are of the kind described in U.S. applications S.N. 317,777 now Patent No. 3,404,100, 317,799 now Patent No. 3,320,182, 317,800 now Patent No. 3,407,149 and 317,828 now Patent No. 3,551,566 filed Oct. 21, 1963 by W. F. Taylor and J. H. Sinfelt. These high activity and high activity maintenance catalysts are characterized by having high nickel-surface areas and high total-surface areas obtained through the interspersion of nickel with aluminum oxide or silica.

In the preparation of the high-activity nickel catalysts for making the desired methane-rich gas, it is important to use the proper proportions, conditions of treatment, proper promoters and prevent contamination by inhibitors or anti-catalysts such as the sodium ion. An interspersion of the nickel with aluminum is preferably obtained by coprecipitating nickel and aluminum compounds of the group consisting of hydroxides, carbonates and basic carbonates with an ammonium compound such as $NH_4HCO_3$ from aqueous solutions of nickel nitrate and aluminum nitrate at temperatures ranging up to boiling point of the solution, drying the precipitate, calcining the precipitate in air at about 750° F. and reducing the calcined precipitate with $H_2$ at about 750° F. The promoting metal is added in the form of a compound which is decomposable to the solution for coprecipitation or to the precipitate before it is dried. The precipitate of the nickel and aluminum compounds preferably contain 40 to 60 wt. percent Ni with 60 to 40 wt. percent $Al_2O_3$ on a dry basis, and the promoter is added in the range of from 1 to 20 wt. percent of the catalyst. The catalyst after activation by hydrogen should then have a surface area above 100 $m.^2/g.$ and a nickel surface area above 20 $m.^2/g.$ of catalyst. The preferred promoting metals are Ba, Sr, Cs, La, Ce, Y, K, Fe and Cu. The promoting metals may be present as compounds, such as oxides, carbonates, or mixtures of such compounds.

The hydrogen treatment activation of the calcined catalyst is conveniently carried out with the catalyst in the reactor to avoid reoxidation by exposure to air.

In the drawing is shown a schematic flow plan of the arrangement of apparatus for converting the hydrocarbon feeds to the methane-rich gas and for treating the gas to obtain the product gas in condition for delivery to a pipe line.

Referring to the drawing, hydrocarbon feed is delivered from storage 1 by pump 2 through line 3 to a heat exchanger 4 where the hydrocarbon feed under pressure absorbs heat from effluent gas leaving the reactor vessel or reactor 5 through line 6 by indirect heat exchange. The preheated hydrocarbon feed is passed by line 7 to the inlet 8 of the reactor 5 where the preheated hydrocarbon feed becomes mixed with steam from line 9. The steam is obtained by pumping water from a makeup storage tank 10 and recirculated water condensate from line 11, passed by pump 12 in line 13 through a heat exchanger 14 where heat is transferred from partially cooled gas product which flows into the heat exchanger 14 from heat exchanger 4 through line 15. The water with preheat is passed from the heat exchanger 14 through line 16 to the heating coil 17, in the heater 18 to be heated to the desired inlet temperature, e.g., 700° F. so that it is then passed at sufficiently high temperature by line 9 into the inlet line 8 of the reactor 5.

The reactor 5 may be in the form of a vertical cylindrical vessel constructed of suitable heat resistant material such as steel to contain the catalyst in the form of granules or pellets above a grid support 19. For closer control of the reaction temperatures in the catalyst bed within the reactor 5, a heat exchange conduit 20 may be provided inside the reactor 5 with inlet to conduit 20 through line 21 and outlet 22 from the conduit. The coolant passed through the conduit 20 may be water hydrocarbon feed, or reaction feed mixture of steam and hydrocarbon. The coolant passed counter-current to the gaseous reaction mixture removes heat by indirect heat exchange from the lower part of the catalyst bed where the temperature tends to rise due to the more exothermic reactions taking place and some of this heat is transferred to the part of the catalyst bed where the more endothermic reactions are initiated. For example, with the inlet mixture of hydrocarbon feed and steam entering the catalyst bed in reactor 5 at a temperature of 700° F., the temperatures in the bed are controlled so that the exit gas leaving the reactor through line 6 is at a temperature of 820° to 830° F.

The gas product effluent from the reactor 5, precooled by heat exchange as in heat exchanger 4 and 14, is passed by line 23 to a cooler 24 to lower the temperature of the gas sufficiently to remove nearly all the water by condensation, preferably at least 99%. This cooling may be carried out by using various coolants, even air, water or hydrocarbon feed materials, if they are at sufficiently low temperatures. The cooled gas containing condensed water, is passed on from cooler 24 through line 25 to a received 26 where the water condensate is dropped out. The water condensate collected in receiver 26 may be recycled through line 11 to the water feed line 13.

Any hydrocarbon condensate collected at this stage may be recycled with the water or separately. The gas product thus freed of water is passed from received 26 through line 27 but still contains a small amount of water vapor, and this water vapor is removed by passing the moist gas through an adsorber vessel 28 or 29, which contains a selective adsorbent for water vapor such as a molecular sieve zeolite of 3 A. or 4 A. pore size which permits the methane-rich gas to retain hydrocarbon components in the $C_2$ to $C_5$ range. The adsorbers 28 and 29 are connected through vessel inlet lines 30 and 31 to line 27 so that periodically when one of the adsorbers is on stream, the other adsorber can be regenerated by passing through the adsorbent material a portion of the dry gas product under low pressure. The adsorbers 28 and 29, having manifold valved pipe connection 32 and 33 to the product gas line 34 which delivers the gas of desired high B.t.u. value and satisfactory dew point to the distributing pipe line.

The molecular sieve zeolites, also known as ion exchange alumino silicates, are particularly effective for selective removal of water vapor from the methane-rich gas. Other adsorbents which may be used are alkaline earth metal oxides which have to be regenerated by use of a dry gas at higher temperatures. Adsorbents such as silica gel or alumina are not as suitable, since they tend to remove hydrocarbon components.

The molecular sieves found best adapted for selective removal of water vapor for the present purposes are the Type 3A and 4A sieves which contain sodium or potassium as the base exchange cations.

The gas product withdrawn from the reactor 5 may be cooled and brought to a suitable temperature for removal of $CO_2$ using known adsorption methods, e.g., an aqueous solution of amino alcohol. The treatment to remove $CO_2$ may be carried out prior to condensation of the water or subsequent to the condensation of the water vapor in the gas product. The removal of the $CO_2$ increases the heating value of the gas.

It is not the object of the present invention to provide a new kind of catalyst for the gasification of the light hydrocarbons and any suitable catalyst may be employed insofar as the catalyst is capable of effecting the low temperature conversion to the high heating value or methane-rich Town Gas with a suitable activity maintenance.

The preferred barium-promoted high nicked-surface area catalyst used in making tests was prepared as follows:

EXAMPLE 1

Preparation of barium promoted Ni-$Al_2O_3$ catalyst

A barium promoted catalyst was made by dissolving 750 g. of $Ni(NO_3)_2 \cdot 6H_2O$ and 740 g. of $Al(NO_3)_3 \cdot 9H_2O$ in 3.0 liters of deionized water. Coprecipitation is carried out by adding 1040 g. of $NH_4HCO_3$ while keeping slurry temperature at approximately 32° F. At the end of the addition, the slurry was stirred an additional 10 minutes and then filtered. To the precipitate 17.2 g. of $Ba(NO_3)_2$ was added and mixed well. The mixture was dried at 350° F. for at least 10 hours and then calcined in air for 4 hours at 750° F. This catalyst analyzed 45.6 wt. percent nickel and 3.2 wt. percent barium and had a total surface area of 145 $m.^2/g.$ catalyst. This catalyst was determined by hydrogen chemisorption to have a nickel surface area of 22 $m.^2/g.$ of catalyst.

The over-all Town Gas process should produce the gas at a required rate and of constant quality with respect to heating value and meeting of dew point values for extended periods of time. With a decline in the activity of the catalyst, it becomes necessary to increase the reaction temperatures, for example, an increase of about 5° to 10° F. in successive periods of about 50 to 70 hours, so as to maintain the rate of gas production. However, in maintaining the rate of gas production there is a tendency for the gas product formed at increased temperatures to become lower in the heating value quality due to the decrease of methane content and increase of hydrogen content considering that the final gas is to be nearly 100% of $H_2$, $CH_4$, $CO_2$ and CO. This trend toward loss of heating value occurs regardless of whether the $CO_2$ is allowed to remain in the gas or is removed. To offset the trend toward lower heating value of the product gas while maintaining a constant rate of gas product, it has been found desirable to lower the conversion deliberately to such an extent so that the product gas includes increased small amounts of $C_2$ to $C_5$ hydrocarbons through partial conversion. With this kind of reaction control the simplified product separation procedure can be used to make the resulting gas product meet dew point specifications.

Dew point specifications can be expected to vary for different locations. The delivery gas pressure is another variable which depends on location. Generally, for a large distribution system a high pressure is desirable. An advantage of the low temperature process is that it operates satisfactorily at high pressure to make the gas product meet the pressure demand without recompression. If the gas is to be delivered at lower pressures, the high pressure gas can easily be expanded, e.g., through a throttle or turbine.

The conversion control and dew point control techniques are illustrated with respect to an optimum process given in the following example.

EXAMPLE 2

Compositions of gas products were based on actual data for the 3% barium-promoted Ni-$Al_2O_3$ catalyst prepared as in Example 1. The initial conditions of operation were the use of a light virgin naphtha of principally pentane and hexane components as the hydrocarbon feed with 2 lbs. of steam per lb. of the hydrocarbon feed in an initial inlet temperature of 700° F., a pressure of 500 p.s.i.g. and a feed rate of 2.8 lbs. of hydrocarbon per lb. of the catalyst per hour. With this kind of operation the inlet temperature does not have to be stepped up to more than about 750° F. for nearly 1000 hours to maintain a conversion at above 90% of the hydrocarbon feed and the total effluent composition is a function of the conversion as shown in the following table.

TABLE I.—RELATION OF GAS PRODUCT TO HYDROCARBON CONVERSION

| | Hydrocarbon conversion, weight percent | | | | |
|---|---|---|---|---|---|
| | 100 | 98 | 96 | 94 | 90 |
| Components, mole percent: | | | | | |
| $H_2$ | 2.68 | 2.92 | 3.17 | 3.41 | 3.88 |
| $CO$ | 0.04 | 0.08 | 0.11 | 0.15 | 0.20 |
| $CO_2$ | 10.02 | 10.02 | 10.00 | 9.921 | 9.60 |
| $CH_4$ | 35.04 | 34.01 | 33.06 | 32.133 | 30.45 |
| $C_2H_6$ | 0.01 | 0.05 | 0.11 | 0.17 | 0.23 |
| $C_3H_8$ | 0.01 | 0.05 | 0.11 | 0.16 | 0.22 |
| $C_4H_{10}$ | 0.01 | 0.01 | 0.02 | 0.02 | 0.03 |
| $C_5H_{12}$ | 0.05 | 0.10 | 0.21 | 0.31 | 0.52 |
| $C_6H_{14}$ | 0.02 | 0.05 | 0.10 | 0.15 | 0.25 |
| $H_2O$ | 52.20 | 52.65 | 53.11 | 53.575 | 54.62 |

The total gas affluent stream thus contains about 52 to 55 mole percent $H_2O$. When this effluent stream is cooled under pressure of 500 p.s.i.g. to a temperature of 100° F., more than 99.5% of the water is removed by condensation. After the removal of so much water by the condensation, the gaseous product stream contains 0.18 mole percent water. Thus, a secondary $H_2O$ removal is required to lower the dew point of the gas, e.g., down to a specifica- of say below 50° F. One way of removing small residual amounts of water is to further cool the gas under pressure, for instance, if the condenser is run at 50° F. instead of 100° F. the water dew point can be lowered, but at the same time a significant amount of hydrocarbons, mostly $C_5$ and higher are condensed. For greater economy and control of product quality, it has been determined that the residual water should be removed with a controlled limited removal of hydrocarbon from the gas stream and this can be achieved by selective adsorption from the gas stream by molecular sieves having 3 A. to 4 A. pore diameters.

While there are alternatives in controlling the condensation of $H_2O$ and the heavier $C_{5+}$ hydrocarbon, e.g., $C_5$ to $C_6$ hydrocarbons, to obtain the required lowering of the dew point without lowering the heating value excessively, such as by lowering the pressure and temperature in the condensation, other factors have to be taken into consideration.

Initially, the requirements of gas quality, with regards to heating value, its pressure for distribtuion and its dew point for a certain location has to be considered. The costs of the gasification and gas purification involve the cost and availability of the hydrocarbon feed, the catalyst cost, cooling cost, the cost of removing $CO_2$ if a higher B.t.u. value is needed, cost of removing and recycling hydrocarbon condensate, and cost of a secondary $H_2O$ removal by adsorbents. With these costs technological factors have to be considered.

Significant relationships have been found with respect to the technological factors, as follows:

On the basis that a light virgin naphtha of principally pentanes and hexanes ($C_5$/160° F.) is to be used as a hydrocarbon feed and the dew point is to be 20° F., the conversion level required with a simplified condensation of the water and secondary removal of water by selective adsorption but with no additional hydrocarbon removal is 93% to give the final gas product a pressure of 100 p.s.i.g. and is 97% to give the gas product a pressure of 400 p.s.i.g. Based on actual life runs with the highly active Ni-$Al_2O_3$ catalysts promoted by Ba, which are capable of giving 90% conversion at 900 hours of operation at pressures of 500 p.s.i.g. and higher conversions for shorter durations, the catalyst cost is increased for use in shorter periods but this increase is not very high when figured on the basis of cost per therm of the gas produced and is offset by eliminating the cost of removing the more readily condensible hydrocarbons. In these determinations, the gas product considered contains the original amount of $CO_2$ (about 20%). The removal of $CO_2$ to a 2% level by scrubbing of the gas product effluent before the primary $H_2O$ condensation increases the heating value but results in only a small increase in dew point.

Representative gas products obtained as overhead from the primary condenser which is preceded by a scrubber to remove $CO_2$, the condenser being operated at 100° F. and 500 p.s.i.g., are summarized in the following Table II.

TABLE II.—OVERHEAD FROM PRIMARY CONDENSER, GASIFICATION AT 500 P.S.I.G. AS RATE OF 100 MOLES/HR.

| | A | | B | | C | |
|---|---|---|---|---|---|---|
| Conversion level, percent | 98 | | 94 | | 90 | |
| Pressure of overhead, p.s.i.g | 100 | 400 | 100 | 400 | 100 | 400 |
| Hydrocarbon dew point, ° F | -16 | 5 | 17 | 47 | 11 | 45 |
| Gas composition, mole percent: | | | | | | |
| $H_2$ | 7.68 | | 9.16 | | 10.62 | |
| $CO$ | 0.21 | | 0.40 | | 0.55 | |
| $CO_2$ | 2.02 | | 1.95 | | 1.99 | |
| $CH_4$ | 89.41 | | 86.31 | | 83.41 | |
| $C_2H_6$ | 0.13 | | 0.46 | | 0.63 | |
| $C_3H_8$ | 0.13 | | 0.43 | | 0.60 | |
| $C_4H_{10}$ | 0.03 | | 0.05 | | 0.80 | |
| $C_5H_{12}$ | 0.26 | | 0.83 | | 1.43 | |
| $C_6H_{14}$ | 0.13 | | 0.40 | | 0.69 | |
| $H_2O$ | | | | | 0.35 | |

Columns A and B show gas compositions overhead from the condenser run at 100° F., 500 p.s.i.g., preceded by $CO_2$ scrubber, and followed by $H_2O$ adsorber. Column C shows the composition overhead from the condenser operated at 50° F., 500 p.s.i.g., preceded by a $CO_2$-removal step but with no additional water-removal step.

The data in Table II show it is feasible to use 50° F. condensation under high pressure to obtain a gas product which when expanded to 100 p.s.i.g. meets 20° F. dew point requirements without a secondary separation of $H_2O$ by adsorption because the water dew point (10.5° F.) is close to the hydrocarbon dew point for the composition C at 100 p.s.i.g.

The data in Table II show that if a higher condensation temperature is used (100° F.) the conversion level should be higher, e.g., about 94 to 98%, for controlled dew point.

The data indicate that for assurance of controlled dew point a standby secondary water removal by adsorption is important to correct for variations of conversion level, of temperatures, and pressures in the condenser, and of the gas passed from the condenser to the delivery system.

An additional factor noted is that some of the gas components, mainly the higher hydrocarbons, tend to be condensed with water vapor in the condenser under pressure, to lower the hydrocarbon dew point of the gas. This indicates that a further control of dew point is obtained by having the hydrocarbon feed to the gasification reactor contain less of the hexane components by substituting more lower boiling components, e.g., butane, which reacts with steam to produce methane. For example, a natural gasoline fraction which may be stabilized so that it contains mainly n-butane and n-pentane, can be used to supplement the naphtha feed or be substituted for the naphtha feed during a final part of a run.

Analytical determinations have indicated that the butane component of the reaction mixture undergo reaction to form the lower paraffins, including methane in the low temperature reaction mixture more readily than propane or ethane insofar as the products at 85% to 98% conversion levels with respect to n-hexane contain increased amounts of propane and ethane. Hence, a significant improvement of lowered gas product dew point is obtainable when n-hexane is replaced in the feed by n-butane and n-pentane, so that the gas on a substantially $CO_2$ and $H_2O$ free basis contains less than 2 mole percent of hydrocarbon higher than $C_4H_{10}$. As indicated, the gas product may contain up to 2 mole percent of $C_5$ and higher hydrocarbons, symbolized as $C_{5+}$, but the $C_{5+}$ hydrocarbons retained are mainly $C_5$ with a smaller amount of $C_6$ hydrocarbons.

In the preferred embodiments of the process for preparing a Town Gas of controlled dew point and high heating value for delivery to a distribution system, the preferred hydrocarbon feed stream contains principally $C_4$ to $C_6$ paraffins which is passed with a suitable amount of steam under a pressure of 400 to 700 p.s.i.g. into a bed of the highly active nickel catalyst. The inlet temperature of the hydrocarbon feed-steam mixture is preferably at temperatures in the range of 600° to 750° F. for a prolonged period of the run, say 500 to 1000 hours, so that the catalyst activity declines slowly from near 100% toward 90% to form the desired gas product stream which is the effluent from the cataliyst bed not with reactor. The gas product should contain $CH_4$ as the principal reaction product with $CO_2$, CO, $H_2$, $C_2H_6$, $C_3H_8$, $C_4H_{10}$, $C_5H_{12}$, $C_6H_{14}$ and excess $H_2O$ vapor. Using an effective catalyst, the initial part of the catalyst bed starting at the inlet tends to have a drop in temperature due to a net endothermic reaction as the reaction mixture passes through the remainder of the cataylst bed; toward the outlet, the temperature of the catalyst tends to rise more than 100° F. due to the exothermic reaction of methanation occurring. To level out the temperature profile of the catalyst bed so that the temperature of the catalyst is prevented from rising to such an extent as to deactivate the catalyst, an indirect heat exchange coolant is used for adsorbing heat from the last section in the bed where the exothermic reaction occurs to pass this heat toward the front end of the bed where the endothermic reaction occurs. In small scale experiments the reactor was surrounded by a mortar lead bath to transfer the heat from the higher temperature catalyst section to the lower temperature catalyst section, the temperature of the lead bath being about 100° F. below the temperature of the bed outlet temperature. In a larger scale operation the exothermic heat can be utilized by being transferred to water or the feed stream which is to be passed to the inlet of the bed. However, with close control of inlet temperatures, the reactor may be operated adiabatically.

With satisfactory reaction operation conditions, the quality of the gas can be monitored by correlation to the $CH_4/H_2$ mole ratio, starting with a fresh highly active catalyst, the $CH_4/CH_2$ ratio for several hours after startup may be above 15:1 with a conversion level close to 100%. Later as the catalyst declines the $CH_4/H_2$ ratio may decrease to about 10. Several hundred hours and finally this ratio becomes lowered to about 4.5 when the catalyst begins to decline very rapidly in activity so that it is no longer useful for producing high B.t.u. gas.

The gas product effluent stream leaving the catalytic reactor is kept under high pressure as it is cooled to a sufficiently low temperature for conditioning out nearly all the water vapor, e.g., for about 99% removal of the water, with some condensed higher hydrocarbons which may occur in the stream when the conversion level is lowered and the hydrocarbon feed stream is not sharply fractionated. The cooling condensation, however, generally can be made to remove nearly all the water and make the gas product contain less than 2 mole percent of the heavier $C_{5+}$ hydrocarbons so that the gas product is then about to meet dew point requirements for the hydrocarbons.

For removal of any residual water vapor to meet the stringent water dew point requirements, e.g., 20° F., the additional amount of water is preferably removal by passing the gas into contact with 3 A. to 4 A. pore diameter molecular sieves. These steps then permit the $C_2$ to $C_4$ paraffins to remain in the gas stream in such amounts as to compensate for the decreasing $CH_4/H_2$ ratio and thereby maintain a more nearly constant heating value without deleteriously affecting the dew point. A relatively small increased amount of $C_2$ to $C_5$ paraffins in the gas product adequately maintains the heating value of the gas product even though the $CH_4/H_2$ ratio drops. Generally, the increased proportion $C_2$ to $C_5$ paraffins needed for this purpose is in the range not much more than 1 to 5 mole percent.

The following tabulated data illustrate how in an intermediate period of a run with declining activity of the catalyst the inlet temperature was gradually increased, more $C_2$ and $C_3$ was present in the gas product to compensate for lowered $CH_4/H_2$ ratio to keep the heating value constant.

TABLE III

| Catalyst: 3% Ba promoted $Ni\text{-}Al_2O_3$. Feed: $C_5/C_6$ Virgin naphtha, 2 lbs. $H_2O$/lb. hydrocarbon | Catalyst 60 g. Pressure 500 p.s.i.g., 26 w./w./hr. mass space velocity | |
|---|---|---|
| Hours | 285–293 | 373–381 |
| Feed inlet temperature, ° F | 690 | 695 |
| Conversion, percent | 95.89 | 93.16 |
| Gas compositions, mole percent: ($H_2O$ and $C_4$+free basis): | | |
| $H_2$ | 7.84 | 7.92 |
| CO | 0.05 | 0.05 |
| $CO_2$ | 20.05 | 22.64 |
| $CH_4$ | 71.48 | 68.73 |
| $C_2H_6$ | 0.41 | 0.47 |
| $C_3H_8$ | 0.16 | 0.24 |
| $CH_4/H_2$ ratio | 9.11 | 8.68 |
| Heating value, B.t.u./s.c.f. (basis scrubbed to 2% $CO_2$, all $H_2O$ and $C_4$+ removed) | 927.7 | 927.6 |

The effect of increased $C_4$ to $C_5$ paraffins is illustrated in the following table.

TABLE IV

[$CO_2$ reduced to 2 mole percent in gas]

| Reactor inlet temperature, ° F. | Conversion weight percent | Heating value, B.t.u./s.c.f. $C_5$ removed | $C_5$ in gas, mole percent | Heating value, B.t.u./s.c.f. $C_5$ in gas |
|---|---|---|---|---|
| 700 | 100 | 950 | 0.0 | 950.0 |
| 725 | 99.0 | 944 | 0.2 | 950.6 |
| 750 | 97.8 | 937 | 0.4 | 950.2 |
| 775 | 96.6 | 928 | 0.7 | 949.5 |
| 800 | 95.0 | 918 | 1.0 | 949.3 |

In the experimental runs continued for more than 900 hours, several facts were discovered with regards to control of the operation.

When the inlet temperature was increased in the range of 750° to 820° F. deactivation became more pronounced and coking began to occur. Lowering of the space velocity was able to bring the conversion back up to about 90% but then the rate of production tends to become less economical and the heating value becomes lower with lowered $CH_4/H_2$ ratio. Changing the hydrocarbon feed so that it contains more reactive hydrocarbons, e.g., normal $C_4$ to $C_6$ paraffins, preferably n-butane and pentane helps to prolong the production of high B.t.u. gas. Finally, adjustments can be made in the amount of $C_4$ to $C_6$ hydrocarbons remaining in the gas product to raise the heating value with care to prevent excessive increase of the dew point.

At a typical dew point specification of 15° F. for the gas product under a pressure of 400 p.s.i.g., the gas can tolerate from 1 to 2 mole percent of pentane for increasing the heating value.

The finished gas with $H_2O$ adequately removed, with $CO_2$ removed if desired, with adjusted heating value and dew point is passed under the desired pressure to storage or a pipe line distribution system.

The invention described is claimed as follows:

1. A process for making Town Gas comprising:

continuously passing mixtures of steam and low boiling hydrocarbon feed containing principally $C_2$ to $C_{10}$ paraffins through a bed of initially high activity low-temperature Town Gas catalyst at bed temperatures ranging from 600° F. to 925° F. and pressures ranging from 100 to 1000 p.s.i.g. at space velocities ranging from 1 to 12 pounds of hydrocarbon per hour per pound of catalyst and steam to hydrocarbon ratios ranging from 1 to 4 pounds of steam per pound of hydrocarbon, whereby said steam and hydrocarbon react to produce an effluent containing, on a water-free basis, principally $CH_4$ with minor proportions of $CO_2$, $H_2$ and CO and whereby said initially high activity catalyst is progressively partially deactivated;

continuing said reaction to produce effluent gases of progressively lower $CH_4/H_2$ ratios at progressively lessened conversions of hydrocarbon while only partially counteracting said deactivation of catalyst by adjusting the bed temperatures upwardly within said 600° F. to 925° F. range to maintain said hydrocarbon conversions above 90%, whereby said effluent contains progressively decreasing proportions of $CH_4$ and progressively increasing proportions of $C_2$ to $C_5$ paraffin components;

separating unreacted steam and $C_{5+}$ hydrocarbons from said effluent to produce a final Town Gas product containing less than 1 mole percent $H_2O$, a $CH_4/H_2$ ratio above 4.5, and less than 2 mole percent of $C_{5+}$ hydrocarbons, the amounts of said $C_2$ to $C_5$ components and unreacted $C_{5+}$ hydrocarbons being sufficient to counteract the effect on product gas heating value of said progressively decreasing proportions of $CH_4$, whereby said heating value is maintained substantially constant as said catalyst is deactivated.

2. The process of claim 1 wherein said bed temperature is adjusted upward about 5° to 10° F. per 50 to 70 hours to partially counteract said catalyst deactivation and maintain the heating value of said final gas product substantially constant.

3. The process of claim 1 wherein the proportion of normal $C_4$ to $C_6$ paraffins in said feed hydrocarbon is increased as said catalyst is deactivated, whereby the catalyst life is prolonged.

4. The process of claim 1 wherein residual water vapor of less than about 1% of the gas product is selectively adsorbed by a base exchange alkali metal alumina silicate having pores of 3 to 4 Angstrom units diameter.

References Cited

UNITED STATES PATENTS

| | | | |
|---|---|---|---|
| 2,714,060 | 7/1955 | Stark | 48—214 X |
| 3,024,867 | 3/1962 | Milton | 23—113 X |
| 3,271,325 | 9/1966 | Davies et al. | 48—214 X |
| 3,320,182 | 5/1967 | Taylor et al. | 48—214 X |
| 3,395,004 | 7/1968 | Taylor et al. | 48—214 |

FOREIGN PATENTS

| | | |
|---|---|---|
| 820,257 | 9/1959 | Great Britain. |

JOSEPH SCOVRONEK, Primary Examiner